May 7, 1929. T. B. FORD 1,712,298
VALVE
Filed Feb. 6, 1928 2 Sheets-Sheet 1

WITNESSES
Edw. Thorpe
Franklin J. Foster

INVENTOR
Thomas B. Ford
BY
ATTORNEY

May 7, 1929.　　T. B. FORD　　1,712,298
VALVE
Filed Feb. 6, 1928　　2 Sheets-Sheet 2
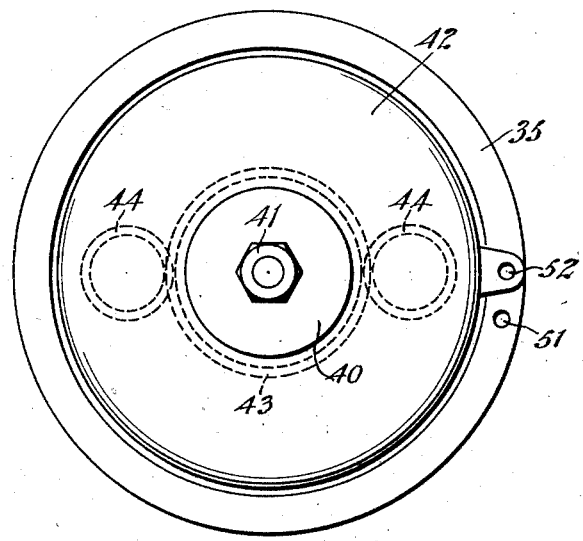
Fig. 3,
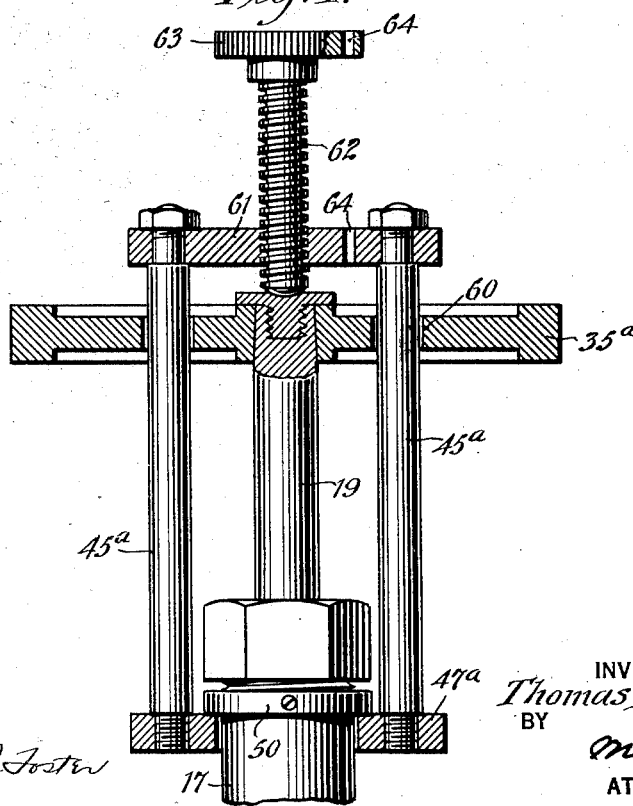
Fig. 4.
WITNESSES
Edw. Thorpe
Franklin J Foster
INVENTOR
Thomas B. Ford
BY
ATTORNEY Patented May 7, 1929.

1,712,298

UNITED STATES PATENT OFFICE.

THOMAS B. FORD, OF NEW YORK, N. Y., ASSIGNOR TO FORD REGULATOR VALVE CO. INC., OF NEW YORK, N. Y., A CORPORATION OF NEW YORK.

VALVE.

Application filed February 6, 1928. Serial No. 252,227.

The valve of the present invention may have a wide and varied range of utility, and may be used for controlling the flow of various types of liquid and gaseous fluids. While the valve is adapted for use as a check valve or pressure relief valve, it finds its principal field of usefulness as a combined pressure-reducing valve, stop valve, limited pressure supply valve, and full pressure supply valve.

The valve is peculiarly well suited for controlling the flow of water to a fire hose, and a feature of the invention is the fact that the valve may be set to limit with accuracy the pressure of the water which is delivered to the hose.

When I refer to the accuracy with which the valve may be regulated, I assume of course that it is to be used with a water supply line under constant inlet or high pressure, such as may be found in practically all tall buildings which use a roof tank for supply purposes.

A more specific object of the invention is to provide a pressure reducing valve which may be adjustably set to prevent the delivery of fluid therethrough at a pressure above a predetermined maximum pressure. Such adjustable setting means may be conveniently locked against unauthorized tampering, but the locking means may be conveniently disengaged or rendered inoperative by an authorized person, such for instance as by a fireman to permit valve adjustment for increased or full water pressures when an emergency occurs.

By virtue of this arrangement, I obviate the possibility of an unauthorized and excitable person turning on a stream of water at full pressure in office building corridors or other locations where the devices may be used. Consequently, the use of the valve, assuming that its original adjustment and locking are to be controlled by the proper authorities, prevents serious accidents occurring when amateur firemen attempt to turn on the water supply. At the same time the valve is designed to permit the duly constituted fire authorities to have access to full water pressure whenever it is needed.

Other and more general objects of the invention are to provide a combination pressure reducing and stop valve in which all the phases of pressure adjustment and manual operation may be quickly and conveniently effected for use on steam or air piping pressure systems, a valve of simple, practical construction, which will be rugged, durable and efficient in use, well suited to the requirements of economical manufacture, and having a range of adjustment which well adapts it to practically any conventional pressure system.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein—

Fig. 3 is a top plan view of the valve.

Fig. 4 is a longitudinal sectional view through a modified form of adjustment mechanism.

Figure 1:
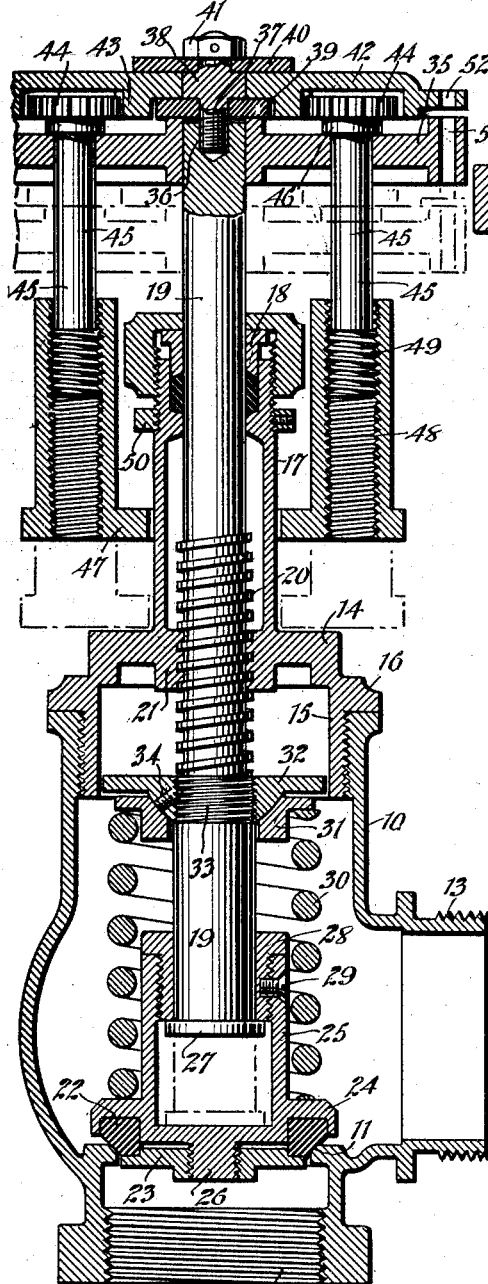
Fig. 1 is a longitudinal sectional view through one form of valve embodying the invention, this view showing the valve in its neutral position where it serves as an ordinary spring check, and the dotted lines indicating the full stop position of the valve.
Figure 2:
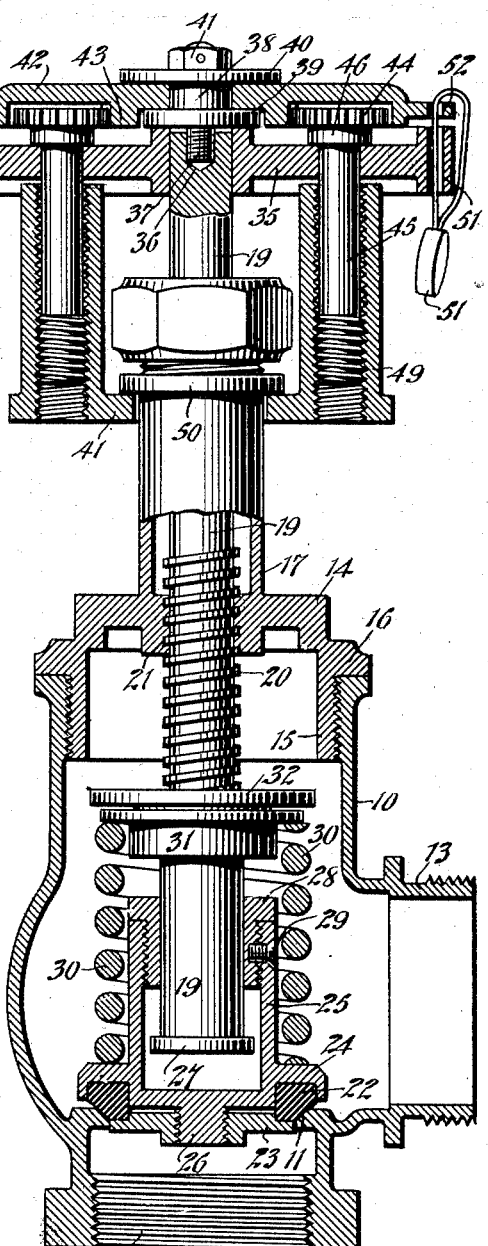
Fig. 2 is a similar view, but showing the valve set to supply fluid under a limited or reduced pressure, and locked in such position. With this valve setting, an unauthorized person might reduce water pressures, but could not increase them beyond the maximum for which the device is set.

Referring first to Figures 1 to 3 inclusive, of the drawings, I have illustrated a valve which includes a casing 10 having an interior valve seat at 11. The valve casing is internally threaded as at 12 beneath the valve seat, so that it may be coupled to a supply line, and is provided above the seat with an externally threaded boss 13 adapted to be coupled to a hose line or other suitable delivery pipe.

The valve bonnet indicated generally at 14 includes a cylindrical apron portion 15 screwed into the open top of the valve casing and formed with the usual external flange 16 which abuts the casing. The apron also includes the usual upstanding hollow cylindrical extension 17 provided with a stuffing box 18 at its top through which the unthreaded portion of the valve stem 19 works. The threaded section 20 of the valve works through the usual threaded passageway 21 at the bottom of the extension 17.

The valve disc 22 which coacts with the seat 11 is preferably clamped between a plate 23 and a flange 24, the latter being integral with a cylinder 25 having a threaded depending extension 26 on to which the plate 23 is screwed. Cylinder 25 receives the lower end of the valve stem 19, and a head or flange 27 on the valve stem has limited movement in the cylinder between the bottom of the cylinder and a bushing 28 screwed into the top of the cylinder and locked by a set screw 29. The cylinder and stem head arrangement provide a lost motion connection between the valve and valve stem which may be taken up to a greater or less extent by a coiled spring 30. This spring encircles the cylinder 25 and the lower end of the stem 19 bearing at its lower end against the flange 24 and at its upper end against a retaining ring 31, the latter being backed against a collar 32 screwed on to the finely threaded section 33 of the valve stem immediately below the portion 21 and locked by a screw 34. The collar 32 fits the cylindrical portion 15 of the bonnet apron, and serves as an auxiliary guide means when the valve stem is screwed upwardly to lift the valve from the position shown in Fig. 1. In Fig. 1 the valve is shown in what may be termed neutral position. The spring 30 is not under compression, and any pressure of water against the under face of the valve will tend to lift the same. In this position, the device may conveniently serve as an ordinary one-way flow spring check valve. When the valve stem 19 is rotated however, to move the head 27 against the bottom of the cylinder 25, the device serves as a stop valve and the valve is positively held against opening. As the stem 19 is screwed down from the full line neutral position to the dotted line stop position of Fig. 1, it is apparent that the spring 30 will be highly compressed, and the lost motion between the valve and stem completely taken up.

It may also be noted that aside from any limited pressure regulating features of the valve, the valve stem may be set at any position between its full line and dotted line position of Fig. 1, compressing the spring 30 to any desired extent. In any of these intermediate positions, the valve may function as a pressure reducing valve. The water issues from the outlet 13 at a pressure equal to the difference between the pressure in the supply line and the pressure of the spring. The device when thus set serves as a convenient relief valve for steam systems or the like, where safety pressures are to be maintained.

It will also be apparent that if the valve stem is screwed upwardly from the full line position of Fig. 1, until the collar 32 is stopped by engagement with the bonnet, the device may serve as a full pressure supply valve.

I shall now describe one convenient mechanism which may be used to set the device for use as a limited pressure valve, and render impossible unauthorized opening of the valve to full pressure supply position. This mechanism as above noted includes an adjustment feature which permits the valve to be set for any limited pressure desired.

Keyed or otherwise secured to the upper outer end of the valve stem 19 is a handle plate or hand wheel 35 preferably of circular shape. A socket 36 in the top of the stem 19 receives the threaded depending extension 37 of a hub member 38. Bearing plates 39 and 40 are clamped between the hub and wheel 35, and the hub and a nut 41 thereon respectively. An adjusting plate 42 is rotatable about the hub 38, its central portion being confined between the bearing plates 39 and 40.

An outwardly facing ring gear 43 is integral with the plate 42, and the teeth of this gear are in mesh with pinions 44 secured to the upper ends of shafts 45. These shafts are disposed in vertical position parallel to the valve stem 19, have bearings in the hand wheel 35, and collars 46 beneath the pinions which rest on the upper surface of the wheel 35.

A floating yoke member 47 encircles the bonnet extension 17, this member carrying at opposite sides internally threaded hollow shafts 48 engaged with the lower threaded ends 49 of the shafts 45. Downward movement of the floating yoke 47 is limited by the top of the cylindrical bonnet portion 15 and upward movement thereof is limited by a collar 50 encircling the bonnet extension 17 immediately below the stuffing box 18.

An opening 51 in the periphery of the wheel 35 is adapted to be aligned with any one of a series of openings 52 in the adjusting plate 42, so that a sealed wire passed through the opening 51 and any of the openings 52 will effectively lock plate 42 and hand wheel 35 against independent rotary movement, and will consequently prevent any relative adjustment of the shafts 45 and 48.

With the parts in the full line position of Fig. 1, it will be noted that the yoke 47 is in its central neutral position between its two stop means, and that this yoke travelling upwardly or downwardly with the valve stem is ineffective to prevent any valve adjustment from the full stop position indicated in dotted lines to the full pressure supply position where the collar 34 abuts the bonnet.

Theoretically, the floating yoke 47 might be adjusted by rotating the plate 42 independently of the hand wheel 35 to a position where it would lock the valve either in the full pressure supply position, or the full stop dotted line position of Fig. 1. In the former instance, the yoke would be moved down against the bonnet while the valve was in its uppermost position, and if the plate 42 and 35 were then locked together, the valve stem could not be shifted downwardly to seat the valve.

In the second instance mentioned, for locking the device in full stop position, the stem would be moved to the full stop position and the yoke 47 then moved against the collar 50 and locked so that the valve stem could not be raised.

The above statement as to possible locking positions of the adjustable yoke 47 while explanatory of its possibilities as a locking device, is not particularly important from a practical standpoint. The primary and outstanding function of the yoke is to prevent the spring, when set for a given maximum water pressure, to be released to an extent which would permit a higher fluid pressure.

This typical function of the adjustable limiting means is clearly apparent from Fig. 2 in which it will be noted that the spring 30 has been partially compressed by screwing down the valve stem 19 from the position of Fig. 1. Also, the adjusting plate 42 has been rotated in a clockwise direction, so that the shafts 45 have been entered more deeply into the hollow shafts 49. A seal 51 has been applied to prevent independent rotation of the plate 42 and wheel 35. With the parts in this position it will be apparent that the wheel 35 and plate 42 may be rotated together to move the valve stem down to a full stop position, but that rotation thereof in the other direction to relieve tension on the spring is limited by the engagement of the floating yoke 47 with the collar 50. Thus, if the spring in Fig. 2 is set for 30 lbs. pressure and the water in the supply line is at 60 lbs. pressure, it is impossible for more than a 30 lb. pressure stream to issue through the outlet 13. It is possible however, for an unauthorized person to reduce the pressure of water issuing from the outlet by screwing the valve stem down and further compressing the spring. In practice, with the parts adjusted as shown in Fig. 2, the valve stem will normally be disposed in its full stop position indicated in dotted lines in Fig. 1. If a fire occurs however, and an unauthorized person attempts to open the valve and feed water to a fire hose, they can only open it to a point where water under 30 lbs. pressure will enter the hose. When the fire department arrive on the scene, however, and decide that greater pressures are desirable, they may break the seal and rotate the plate 42 in a counter clockwise direction independently of the hand wheel, after which the hand wheel may be turned to move the valve to full pressure supply position.

To briefly recapitulate, I have provided a valve which may serve as a one-way check valve, as a pressure regulating valve, as an automatic relief valve, as a full pressure supply valve, or as a limited pressure supply valve. I have also provided adjustable means for predetermining the setting of the device when used for limited pressure supply purposes, so that the device may be arranged to deliver fluid at any predetermined limited pressure.

It may be further noted that the adjustable limiting means may if desired be used for selectively locking the valve against unauthorized manipulation when it is in full stop position, or full pressure supply position.

In the foregoing description I have entered rather fully into the structural details of the valve mechanism and adjustment mechanism, although it will be quite apparent that both of such mechanisms are subject to a wide variety of structural embodiments within the scope of the present invention.

I have illustrated in Fig. 4 one typical alternative construction for the adjustment mechanism. In this form of the invention a floating yoke 47$^a$ corresponding to the yoke 47 carries rods 45$^a$ working through openings 60 in the hand wheel 35$^a$ and having their upper ends connected to a cross head 61, which cross head is vertically adjustable by a screw 62 passing therethrough and bearing against the top of the valve stem 19. In this form of the invention the cross head 61 and the screw handle 63 are provided with aligned openings 64 for the reception of a sealing device, and adjusting of the yoke 47 toward and away from the hand wheel 35$^a$ is simply effected by turning the screw 62 to raise and lower the cross head 61 and with it the yoke 47$^a$.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A valve including a casing having an inlet and outlet and a valve seat therebetween, a valve to coact with said seat, an axially shiftable valve stem, a lost motion connection between said valve and stem, a coiled expansion spring interposed between the valve and stem and tending to resist relative movement thereof in a direction to take up the lost motion, adjustable means to limit relative movement of the valve and stem in the opposite direction, and a bonnet on the casing through which the stem is axially movable, a floating yoke forming part of said adjustable means and engageable with stop means on the bonnet.

2. A valve including a casing having an inlet and outlet and a valve seat therebetween, a valve to coact with said seat, an axially shiftable valve stem, a lost motion connection between said valve and stem, a coiled expansion spring interposed between the valve and stem and tending to resist relative movement thereof in a direction to take up the lost motion, adjustable means to limit relative movement of the valve and stem in the opposite direction, a bonnet on the casing through which the stem is axially movable, a floating yoke forming part of said adjustable means and engageable with stop means on the bonnet, a handle on the valve stem, and yoke adjusting means associated with the handle.

3. A valve including a casing having an inlet and outlet and a valve seat therebetween, a valve to coact with said seat, an axially shiftable valve stem, a lost motion connection between said valve and stem, a coiled expansion spring interposed between the valve and stem and tending to resist relative movement thereof in a direction to take up the lost motion, adjustable means to limit relative movement of the valve and stem in the opposite direction, a bonnet on the casing through which the stem is axially movable, a floating yoke forming part of said adjustable means and engageable with stop means on the bonnet, a handle on the valve stem, yoke adjusting means associated with the handle, and means for locking the yoke adjusting means and handle, and thereby the yoke and stem against relative movement.

4. A valve including a body and a bonnet, a body having inlets and outlets therein, a valve seat between said inlets and outlets, a valve coacting with the seat, said valve having a cylindrical extension, a valve stem carried by and axially adjustable through the bonnet, a head fixed to the valve stem having limited movement in the cylindrical valve extension whereby to provide a lost motion connection, flanges fixed to the stem and cylinder, and a coiled expansion spring confined between them and encircling the stem, said spring opposing movement of the stem to take up the lost motion, a floating collar encircling the bonnet and adjustably fixed to move with the stem, and stop means on the bonnet to limit movement of the collar, and consequently the valve stem.

5. A valve including a casing provided with an inlet, an outlet, and a valve seat between them, a valve adapted to coact with the seat, an axially shiftable valve stem, a lost motion connection between the valve and stem, a spring opposing relative movement of the valve and stem to take up such lost motion, and tending when under compression to urge the valve against its seat, means whereby axial movement of the stem in one direction when the valve is seated compresses the spring, and adjustable means for limiting movement of the stem in the opposite direction.

Signed at New York, in the county of New York and State of New York, this 1st day of February, A. D. 1928.

THOMAS B. FORD.